US011030262B2

(12) United States Patent
Bortnikov et al.

(10) Patent No.: US 11,030,262 B2
(45) Date of Patent: Jun. 8, 2021

(54) RECYCLABLE PRIVATE MEMORY HEAPS FOR DYNAMIC SEARCH INDEXES

(71) Applicant: Oath Inc., New York, NY (US)

(72) Inventors: Edward Bortnikov, Haifa (IL); Guy Gueta, Holon (IL); Pranav Sharma, Cupertino, CA (US)

(73) Assignee: Verizon Media Inc., New York, NY (US)

( * ) Notice: Subject to any disclaimer, the term of this patent is extended or adjusted under 35 U.S.C. 154(b) by 331 days.

(21) Appl. No.: 14/835,522

(22) Filed: Aug. 25, 2015

(65) Prior Publication Data

US 2017/0061012 A1 Mar. 2, 2017

(51) Int. Cl.
| | |
|---|---|
| *G06F 16/9535* | (2019.01) |
| *G06F 12/02* | (2006.01) |
| *G06F 3/06* | (2006.01) |
| *G06F 16/31* | (2019.01) |
| *G06F 16/951* | (2019.01) |

(52) U.S. Cl.
CPC .......... *G06F 16/9535* (2019.01); *G06F 3/067* (2013.01); *G06F 3/0608* (2013.01); *G06F 3/0652* (2013.01); *G06F 12/0253* (2013.01); *G06F 16/316* (2019.01); *G06F 16/951* (2019.01); *G06F 2212/1024* (2013.01); *G06F 2212/1028* (2013.01); *G06F 2212/1044* (2013.01); *G06F 2212/154* (2013.01); *G06F 2212/163* (2013.01)

(58) Field of Classification Search
CPC ............. G06F 17/30867; G06F 3/0652; G06F 3/0608; G06F 12/0253; G06F 2212/1044; G06F 2212/154
See application file for complete search history.

(56) References Cited

U.S. PATENT DOCUMENTS

| | | | | |
|---|---|---|---|---|
| 5,717,919 | A * | 2/1998 | Kodavalla | G06F 16/2282 |
| 6,757,890 | B1 * | 6/2004 | Wallman | G06F 8/43 |
| | | | | 711/E12.006 |
| 6,760,815 | B1 * | 7/2004 | Traversal | G06F 9/45504 |
| | | | | 707/999.202 |
| 7,827,373 | B2 * | 11/2010 | Kaakani | G06F 12/023 |
| | | | | 711/170 |
| 9,418,004 | B1 * | 8/2016 | Chapman | G06F 12/0276 |
| 9,542,439 | B1 * | 1/2017 | Cohen | G06F 16/2343 |
| 9,785,712 | B1 * | 10/2017 | Lazar | G06F 16/951 |
| 2006/0059474 | A1 * | 3/2006 | Bhansali | G06F 12/0276 |
| | | | | 717/151 |

(Continued)

OTHER PUBLICATIONS

Evans, Chris, "In-memory databases—what they do and the storage they need," ComputerWeekly.com, May 28, 2014, downloaded from http://www.computerweekly.com/feature/In-memory-databases-What-they-do-and-the-storage-they-need.

(Continued)

*Primary Examiner* — Ashish Thomas
*Assistant Examiner* — Abdullah A Daud
(74) *Attorney, Agent, or Firm* — Cooper Legal Group, LLC

(57) ABSTRACT

In one embodiment, a search engine may generate and store a plurality of search index segments such that each of the search index segments is stored in a corresponding one of a plurality of heaps of memory. The plurality of search index segments may include inverted index segments mapping content to documents containing the content. A garbage collection module may release one or more heaps of the memory.

25 Claims, 4 Drawing Sheets

(56) References Cited

U.S. PATENT DOCUMENTS

| | | | | |
|---|---|---|---|---|
| 2007/0101091 A1* | 5/2007 | Kaakani | G06F 12/023 | 711/170 |
| 2008/0097993 A1* | 4/2008 | Nanba | G06F 16/3331 | |
| 2009/0024679 A1* | 1/2009 | Amundsen | G06F 12/0253 | |
| 2009/0031292 A1* | 1/2009 | Fulton | G06F 9/4493 | 717/151 |
| 2009/0193406 A1* | 7/2009 | Williams | G06F 16/951 | 717/168 |
| 2009/0271799 A1* | 10/2009 | Barsness | G06F 9/5072 | 718/106 |
| 2010/0138460 A1* | 6/2010 | Ogasawara | G06F 12/0276 | 707/813 |
| 2012/0324199 A1* | 12/2012 | Yamashita | G06F 12/0269 | 711/170 |
| 2013/0263149 A1* | 10/2013 | Dai | G06F 9/5016 | 718/104 |
| 2013/0311730 A1* | 11/2013 | Slattery | G06F 12/0269 | 711/156 |
| 2013/0318132 A1* | 11/2013 | Basu | G06F 12/0276 | 707/816 |
| 2014/0047209 A1* | 2/2014 | Pizlo | G06F 11/3452 | 711/173 |
| 2014/0136543 A1* | 5/2014 | Frieden | G06F 16/90324 | 707/741 |
| 2015/0026428 A1* | 1/2015 | Bobroff | G06F 12/0253 | 711/170 |
| 2015/0058381 A1* | 2/2015 | Wilhelmsson | G06F 9/45533 | 707/813 |
| 2015/0227414 A1* | 8/2015 | Varma | G06F 11/073 | 714/47.1 |
| 2015/0227624 A1* | 8/2015 | Busch | G06F 16/24578 | 707/728 |
| 2015/0261670 A1* | 9/2015 | Cheriton | G06F 11/1438 | 711/159 |
| 2015/0379259 A1* | 12/2015 | Mohammed | H04L 63/20 | 726/6 |
| 2016/0239343 A1* | 8/2016 | Holt | G06F 9/485 | |
| 2016/0246655 A1* | 8/2016 | Kimmel | G06F 12/0842 | |

OTHER PUBLICATIONS

Feng, Yi et al., "A locality-improving dynamic memory allocator," MSP'05, Chicago, © 2005 ACM.

Microsoft Windows Dev Center, "HeapCreate function," © 2015 Microsoft, last updated Nov. 3, 2014, downloaded from https://msdn.microsoft.com/en-us/library/windows/desktop/aa366599(v=vs.85).aspx.

Rumble, Stephen M. et al., "Log-structured memory for DRAM-based storage," Proceedings of the $12^{th}$ USENIX Conference on file and storage technologies, Feb. 17-20, 2014.

Wikipedia, "Search engine indexing," last modified Aug. 13, 2015, downloaded from https://en.wikipedia.org/wiki/Search_engine_indexing.

* cited by examiner

RECYCLABLE PRIVATE MEMORY HEAPS FOR DYNAMIC SEARCH INDEXES

BACKGROUND OF THE INVENTION

The disclosed embodiments relate generally to computer-implemented methods and apparatus for managing dynamic search indexes.

One conventional way for users to search for information is to initiate a search query through a search service's web page. Typically, a user can enter a query including one or more search terms into an input box on the search web page and then initiate a search based on the entered search terms. In response to the query, a web search engine generally returns an ordered list of search result documents.

To facilitate the retrieval of relevant documents in the processing of search queries, a search engine typically parses documents and generates a search index offline. Often, the search engine generates a forward index that includes, for each document, a list of words that occur in the document. However, querying the forward index to identify relevant search result documents would require sequential iteration through each document to verify a matching document. The time, memory, and processing resources to perform such a query are not technically realistic.

To optimize speed and performance in finding relevant documents for search queries, the search engine typically generates an inverted index. An inverted index, also referred to as a postings file or an inverted file, is an index data structure storing a mapping from content, such as words or numbers, to locations of the content in a database file, or a mapping from content to a document or set of documents. In other words, an inverted index may map words to documents containing those words. After the inverted index is generated offline, the inverted index is deployed for use online.

The search engine may process a search query by scanning the inverted index for terms in the search query to identify documents containing the search terms. Without an inverted index, the search engine would scan every document in the corpus, which would require considerable time and computing power.

SUMMARY OF THE INVENTION

In one embodiment, a search engine may generate and store a plurality of search index segments such that each of the plurality of search index segments is stored in a corresponding one of a plurality of heaps of memory. The search index segments may include inverted index segments mapping content to documents containing the content. A garbage collection module may release one or more heaps of the memory.

In another embodiment, a device includes a processor and a memory. The processor and memory may be configured to perform one or more of the disclosed method operations. In another embodiment, a computer readable storage medium having computer program instructions stored thereon that are arranged to perform one or more of the disclosed method operations.

These and other features and advantages of the disclosed embodiments will be presented in more detail in the following specification and the accompanying figures.

DETAILED DESCRIPTION OF THE SPECIFIC EMBODIMENTS

Figure 1:
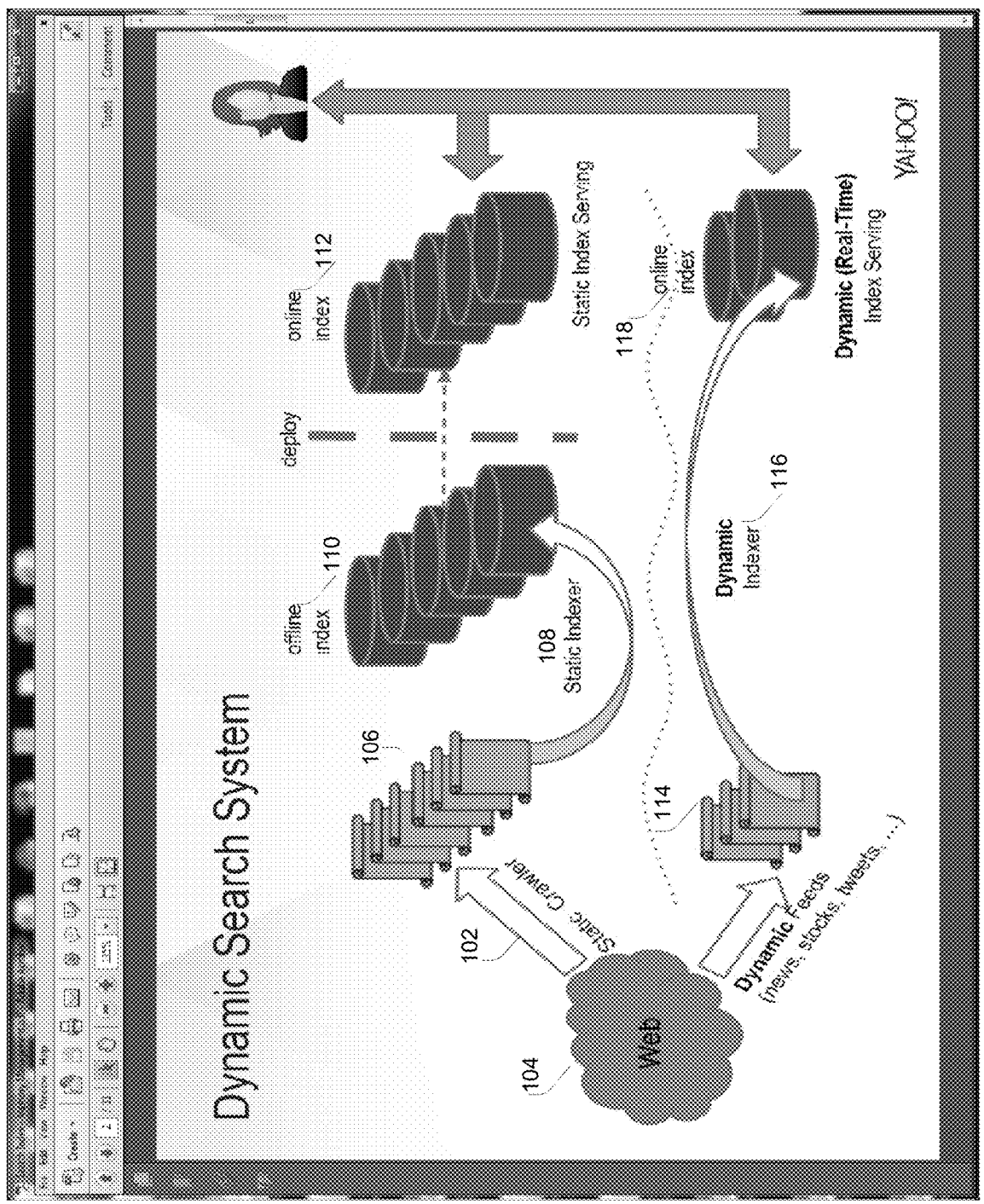
FIG. 1 is a diagram illustrating an example search system in accordance with various embodiments.

Reference will now be made in detail to specific embodiments of the disclosure. Examples of these embodiments are illustrated in the accompanying drawings. While the disclosure will be described in conjunction with these specific embodiments, it will be understood that it is not intended to limit the disclosure to these embodiments. On the contrary, it is intended to cover alternatives, modifications, and equivalents as may be included within the spirit and scope of the disclosure as defined by the appended claims. In the following description, numerous specific details are set forth in order to provide a thorough understanding of the disclosure. The disclosed embodiments may be practiced without some or all of these specific details. In other instances, well known process operations have not been described in detail in order not to unnecessarily obscure the disclosure. The Detailed Description is not intended as an extensive or detailed discussion of known concepts, and as such, details that are known generally to those of ordinary skill in the relevant art may have been omitted or may be handled in summary fashion.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

In accordance with various embodiments, a search index may be implemented in the form of multiple search index segments that are stored in respective memory heaps that correspond to different successive generations of documents. The term heap (i.e., memory heap) may refer to a contiguous segment of memory. Memory may be released in heaps to reduce memory fragmentation.

The search index may be generated and updated dynamically in real-time. This may be accomplished, in part, by maintaining a current "active" index segment having a read/write status. Remaining index segments may have a read-only status, enabling the remaining index segments to be read but not modified.

In addition, memory management may be performed separately for query processing and document processing. This may be accomplished by storing per-query data such as search query terms in a memory heap that is separate from the search index.

FIG. 1 is a diagram illustrating an example search system in accordance with various embodiments. Typically, a web crawler 102 periodically browses the Internet 104 for the purpose of Web indexing. Documents 106 retrieved by the web crawler are generally processed offline by a static indexer 108 to generate an offline search index 110. Once the search index 110 is built, the search index 110 is deployed for use online 112 by a search server. A search server may then use the search index to identify search results that are relevant to search queries that it receives. Since search indexes are often static and generated only periodically, content that has recently been published on the Internet may not be reflected in the search indexes. As a result, search results identified using the search indexes may not include the recently published content.

In accordance with various embodiments, documents 114 may be obtained, retrieved, or received via the Internet 104 and processed dynamically by a dynamic indexer 116 to dynamically generate and update an online search index 118 in real-time. Each of the documents may be defined by a Uniform Resource Locator (URL) that identifies a location at which the document can be located. For example, the documents may include news articles, blogs, tweets, etc. Since the search index is continuously updated, content may be searchable within a short period of time after it is published on the Internet.

Figure 2:
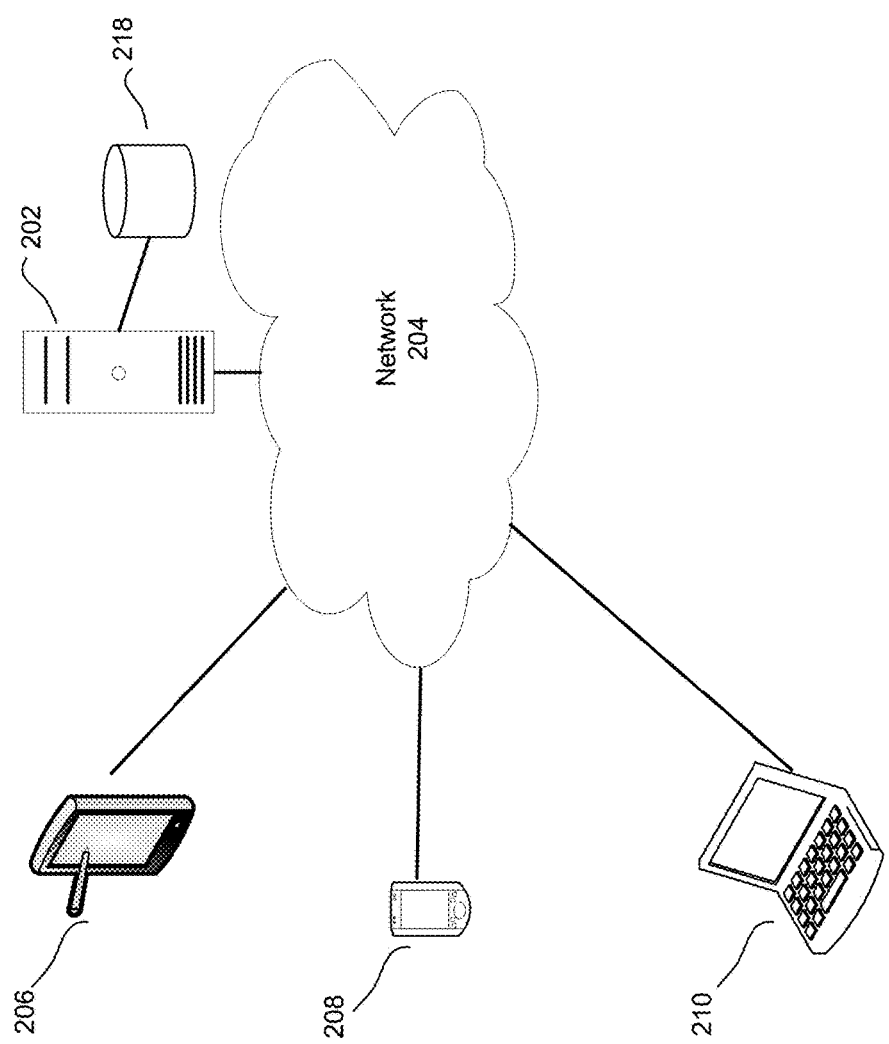
FIG. 2 is a diagram illustrating an example system in which embodiments may be implemented.

FIG. 2 is a diagram illustrating an example system in which various embodiments may be implemented. As shown in FIG. 2, the system may include one or more servers 202, which may be associated with a web site. The server(s) 202 may enable the web site to provide a variety of services to its users. More particularly, the server(s) 202 may include a web server, search server, and/or content server. The server(s) 202 may also include an ad server.

The search server may dynamically generate and update a search index during traversal or processing of documents online. Specifically, a search index may be implemented in the form of a plurality of search index segments. More particularly, one or more indexers may generate or update one or more inverted index segment(s) that each map contents (e.g., words) to documents containing the content. In some embodiments, the indexers may generate or update one or more forward indexes that list the contents (e.g., words) per document, and invert the forward indexes to generate and/or update one or more inverted index segments. Since each search index segment may be a relatively large object such as an array or other suitable data structure, each search index segment may be stored in a separate memory heap. Various methods and data structures for generating and managing search indexes and corresponding memory heaps will be described in further detail below.

The disclosed embodiments may be implemented in some centralized manner. This is represented in FIG. 2 by server(s) 202, which may correspond to multiple distributed devices and data store(s). The server(s) 202 and/or corresponding data store(s) may store user account data, user information, and/or content.

Clients 206, 208, 210 may access a search application on the search server via a network 204. The network 204 may take any suitable form, such as a wide area network or Internet and/or one or more local area networks (LAN's). The network 204 may include any suitable number and type of devices, e.g., routers and switches, for forwarding search or web object requests from each client to a search or web application and search or web results back to the requesting clients.

The disclosed embodiments may also be practiced in a wide variety of network environments (represented by network 204) including, for example, TCP/IP-based networks, telecommunications networks, wireless networks, etc. In addition, computer program instructions with which embodiments of the invention may be implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

Implementations are contemplated in which users interact with a diverse network environment. For example, the network 204 may include a variety of networks, such as a LAN/WAN.

A search application generally allows a user (human or automated entity) to search for information via the network 204 by submitting a search query including one or more search terms. More particularly, a graphical user interface including an input feature (e.g., input box, search box, or search query section) is presented to the client. Typically, the graphical user interface may present an input feature into which a user may type at least a portion of a search query including any number of search terms or portion thereof.

The clients 206, 208, 210 may transmit search queries to the server(s) 202 via the network 204. Upon receiving search queries, the search queries may be executed via one or more search applications (e.g., associated with search server and/or web server). The search application(s) may be implemented on any number of servers although only a single server 202 is illustrated for clarity.

The server(s) 202 may process the search queries using the search index to identify the most relevant search result documents. More particularly, the server(s) 202 may query at least a portion of the segments of the search index. For example, the search index segments may have associated therewith a sequential order that indicates the recency with which each of the search index segments has been generated or updated. The search index segment that has been most recently generated or updated may be referred to as the "youngest" search index segment, while the search index segment that has been generated or updated least recently may be referred to as the "oldest" search index segment. The server(s) 202 may first scan the "youngest" (e.g., most recently generated) segments to identify search documents that contain word(s) in the search queries. For example, documents that are most relevant may be those that contain all or most of the search terms of a search query. Upon identifying a threshold number of relevant documents, the server(s) 202 may discontinue scanning the search index without scanning the remaining segments of the search index.

While processing a search query, the server(s) 202 may store per query data separately from the search index. Generally, objects that are pertinent to a specific query (e.g., search terms and/or search context) will be smaller objects. Memory may be allocated such that the per-query objects are stored in a single memory heap associated with the query. In some embodiments, a pre-defined amount of memory is allocated to the memory heap for storage of the objects. After the query has been processed, the per-query data may be discarded and the corresponding memory can be released to the query objects memory heap.

In accordance with various embodiments, the search server may perform garbage collection to release one or more heaps of memory. For example, the search server may delete older segments of the search index and release the corresponding memory heaps. Garbage collection may be performed periodically after expiration of a period of time. Alternatively, garbage collection may be performed in response to a determination that a threshold amount of memory has been consumed or, alternatively, that a threshold amount of memory remains.

The search server 202 may transmit a plurality of hypertext links that identify the search result documents to the corresponding requesting client. In some embodiments, search results returned by the search server 202 may be further identified based, at least in part, on a context of the user. For example search results may be identified based, at least in part, on a location of the client. In addition, search results may be identified based, at least in part, on a user profile associated with a user submitting the search query.

A variety of mechanisms may be implemented to support the generation of user profiles including, but not limited to, collecting or mining navigation history, stored documents, tags, or annotations, to provide a few examples. Profiles of users of a search engine, for example, may give a search engine provider a mechanism to retrieve annotations, tags, stored pages, navigation history, or the like, which may be useful for making relevance determinations of search results, such as with respect to a particular user.

In accordance with various embodiments, the server(s) 202 may have access to one or more user logs (e.g., user databases) into which user information is retained for each of a plurality of users. This user information or a portion thereof may be referred to as a user profile. More particularly, the user profile may include public information that is available in a public profile and/or private information. The user logs may be retained in one or more memories 218 coupled to the server 202.

The user information retained in the user logs may indicate a plurality of features for each user. More particularly, the features may include personal information such as demographic information (e.g., age and/or gender) and/or geographic information (e.g., residence address, work address, zip code, and/or area code). In addition, each time a user performs online activities such as clicking on a web page (or region thereof) or an advertisement, or purchasing goods or services, information regarding such activity or activities may be retained as user data in the user logs. For instance, the user data that is retained in the user logs may indicate the identity of web sites visited, identity of ads that have been selected (e.g., clicked on) and/or a timestamp. In addition, the features may indicate a purchase history with respect to one or more products, one or more types of products, one or more services, and/or one or more types of services. Additional features may indicate one or more interests of the user.

The user logs may further include query logs into which search information is retained. Each time a user performs a search on one or more search terms, information regarding such search may be retained in the query logs. For instance, the user's search request may contain any number of parameters, such as user or browser identity and the search terms, which may be retained in the query logs. Additional information related to the search, such as a timestamp, may also be retained in the query logs along with the search request parameters. When results are presented to the user based on the entered search terms, parameters from such search results may also be retained in the query logs. For example, an identity of the specific search results (e.g., Uniform Resource Locators (URLs)), such as the web sites, the order in which the search results are presented, whether each search result is a sponsored or algorithmic search result, the owner (e.g., web site) of each search result, and/or whether each search result is selected (i.e., clicked on) by the user (if any), may be retained in the query logs.

There are two different types of data that may be stored by a search engine. Long-lived data may include data that the search engine maintains over multiple search sessions and across multiple users. For example, long-lived data may include documents, links to documents, and/or search index segments. Short-lived data may include data that is maintained by the search engine for a short period of time such as for the duration of a single search session. For example, short-lived data may include per-query data such as the user's search query (or search query terms), the user's search context, and/or hypertext links to documents that are relevant to the user's search query. Generally, long-lived data may be maintained for hours while short-lived data may be maintained for a fraction of a second.

To ensure that user queries are responded to in an efficient manner, data structures that are used to serve user queries such as search indexes and per-query data may be stored in random access memory (RAM). In addition, updates to the search index and user queries may be processed concurrently.

Figure 3:
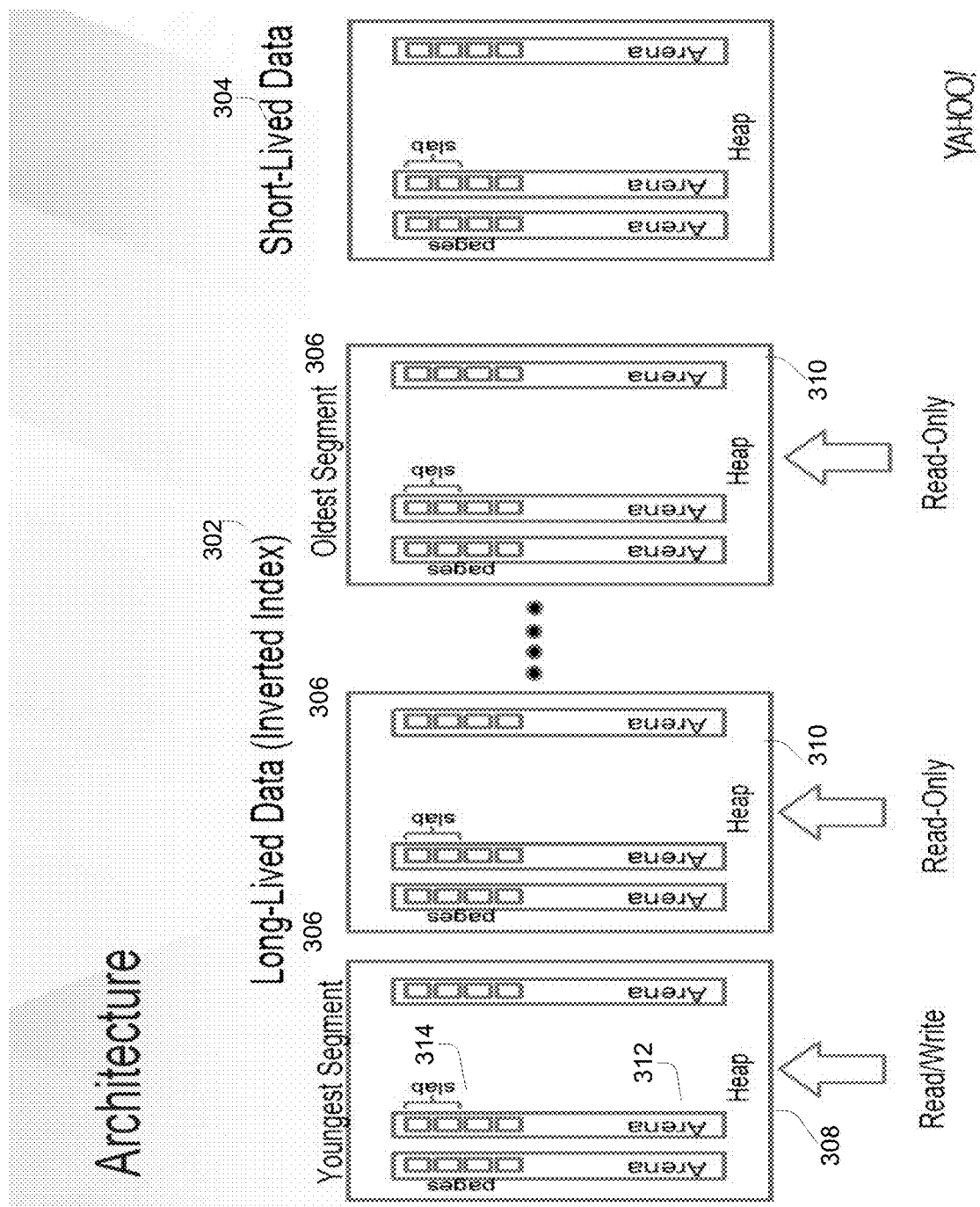
FIG. 3 is a diagram illustrating an example architecture that may be used to implement the disclosed embodiments.

FIG. 3 is a diagram illustrating an example architecture that may be used to implement the disclosed embodiments. As shown in this example, long-lived data 302 such as a search index may be stored separately from short-lived data 304 such as per-query data. For example, long-lived data 302 may be stored in a separate section in random access memory (RAM) from short-lived data 304.

The inverted index is a central component of a typical search engine indexing algorithm. A goal of a search engine implementation is to optimize the speed of responding to a search query by finding the documents in which a search term occurs using the index.

In accordance with various embodiments, the long-lived data 304 may include an inverted index that is stored as multiple search index segments 306. Each search index segment 306 may include an inverted index segment mapping content to documents containing the content. For example, a search index segment 206 may map words to links via which documents containing those words may be accessed. The search index segments 306 may be stored as a sequence of search index segments stored over time. For example, the search index segments 306 may be stored as multiple separate arrays or linked lists.

In some embodiments, the search engine may update a current search index segment 308 that has read/write status until the search engine determines that a threshold has been reached. For example, the threshold may identify a particular number of documents or amount of memory (e.g. RAM). When the search engine determines that the threshold has been reached for the current search index segment, the search engine may discontinue updating the current search index segment and generate a new search index segment. The status of the discontinued search index segment may be changed from read/write to read-only, while the status of the newly generated search index segment may be set to read/write.

In accordance with various embodiments, only a single one of the search index segments (and corresponding memory heap) has read/write status at any given point in time. Therefore, the current youngest search index segment 308 (e.g., corresponding to a generation of documents recently processed by the search engine) may have read/write status, while the remaining older search index segments 310 (e.g., corresponding to generations of documents that were previously processed by the search engine) may have read-only status.

Memory is typically allocated to a search index as a single pool of memory. However, the memory may serve different customers and applications that are not coordinated with one another. As memory is released, the pool of memory is fragmented.

In addition, a memory allocator is typically unaware of the lifecycle of various portions of the search index, resulting in poorly utilized RAM. To improve memory utilization, this is typically addressed via memory compaction, which is expensive. Memory allocation to search indexes also typically suffers from low hardware locality, resulting in a greater number of page faults. Furthermore, allocation overhead and synchronization costs are common.

In accordance with various embodiments, the search index segments 306 may be stored such that each of the search index segments 306 is stored in a separate corresponding "private heap" of memory. Similarly, the short-lived data 304 such as per-query data may be stored in a single dedicated heap of memory that is separate from the search index segments 306, as shown in this example.

The search index segments 306 may be stored such that an order is associated therewith. More particularly, the order may indicate a sequential order in which the search index segments 306 have been generated. The order may be implicit or integral to the manner in which the search index segments 306 are stored. Alternatively, the order may be explicit. While the search index segments of a search index may have a sequential order associated therewith, the memory heap of one index segment need not be contiguous with the memory heap of another "subsequent" or "previous" index segment.

Memory management may be performed on a per-heap basis. In other words, memory may be released in the form of heap(s). As the oldest search segment becomes less relevant, the oldest search segment may "expire" and be discarded. Since the oldest search segment(s) are periodically discarded, the memory heap(s) storing the oldest search segment(s) may be periodically released. For example, garbage collection may be performed on a periodic basis, upon determining that a threshold amount of memory has been used or remains available, or based upon the number of search index segments that are stored.

In some embodiments, infrequently used data may be compressed. More particularly, older infrequently accessed search index segments may be compressed.

To reduce fragmentation within heaps, each heap may be divided into further pools of memory. More particularly, different pools of memory may be associated with different central processing units (CPUs). In addition, pools of memory may be associated with different ranges of object sizes. Examples of various data structures that may subdivide memory heaps will be described in further detail below.

To facilitate memory management in a multi-threaded environment, each heap within the long-lived data 302 may include two or more sections or sub-heaps, which may be referred to as arenas 312, where each arena corresponds to a different one of two or more central processing unit (CPU) cores. Since objects are typically created and released by the same thread, the dedication of an arena to each CPU core supports reduced synchronization and results in faster memory access.

Within each arena, the arena may be subdivided into two or more different pools, which may be referred to as slabs 314, where each slab corresponds to a different set (e.g., range) of object sizes. For example, smaller object sizes may be grouped together in one slab, while larger object sizes may be grouped together in another slab. By grouping objects of similar sizes together within a slab, the boundaries of the slabs may be tuned to reduce memory fragmentation. For example, a slab storing a search index segment may be optimized to store larger objects (e.g., array storage). As another example, a slab storing short-lived data may be optimized to store smaller per-query objects. Therefore, a slab that will store smaller objects may include less memory than a slab that will store larger objects.

Multi-threaded processes may be supported by multiple CPU cores. A CPU core may store an object in one of two or more slabs associated with the CPU according to the size of the object. More particularly, each slab of the arena for the CPU core may correspond to a different range of object sizes. Furthermore, each slab may include an amount of memory appropriate for the range of object sizes that it will store.

Heap(s) storing short-lived data 304 may have the same data structure as heaps within the long-lived data 302, as shown in this example. Similarly, heap(s) within the short-lived data 304 may be managed via a garbage collection process that maintains the long-lived data. In other embodiments, short-lived data 304 and associated memory may be managed using different data structures and/or garbage collection processes.

Figure 4:
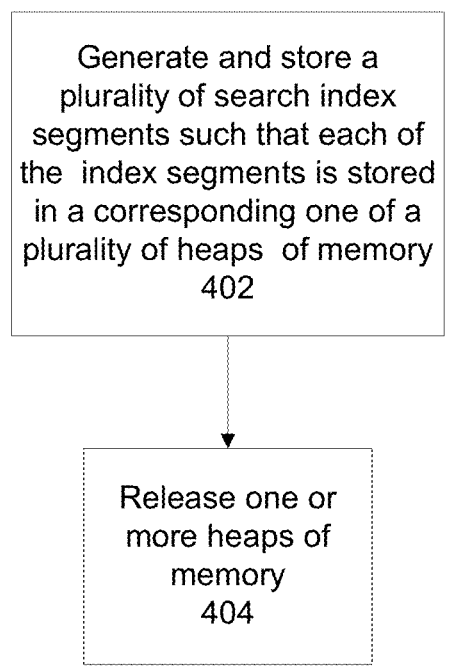
FIG. 4 is a process flow diagram illustrating an example method of implementing dynamic search indexes in accordance with various embodiments.

FIG. 4 is a process flow diagram illustrating an example method of implementing dynamic search indexes in accordance with various embodiments. As shown in FIG. 4, a search engine may generate and store a plurality of search index segments at 402, where the search index segments include inverted index segments mapping content to documents containing the content. Each of the search index segments may be stored in a corresponding one of a plurality of heaps of memory. The search index segments may be generated and stored in real-time as documents are obtained, received, or processed.

In some embodiments, a particular amount of memory may be allocated to each individual heap of memory. For example, the amount of memory may be statically defined. As a result, each of the heaps of memory associated with the search index may include the same amount of memory. Since memory may be allocated on a per-heap basis as search index segments are generated, memory allocation may be performed in an efficient manner.

Each search index segment may be generated from a corresponding generation of documents. More particularly, the search engine may generate an inverted index fragment that includes search index postings. For example, the search engine may generate a forward index based upon a set of documents, and invert the forward index to generate the inverted index fragment. The inverted index fragment may be stored as an inverted index segment or portion thereof in a corresponding memory heap. Additional search index fragments may be appended to the current search index segment. More particularly, memory may be incrementally allocated to a search index fragment from the memory heap. This process may continue for further sets of documents to update the current (youngest) search index segment stored in the current memory heap until the search engine determines that a threshold has been reached for the current search index segment and corresponding memory heap. For example, the threshold may identify a particular number of documents or amount of memory (e.g. RAM) within the memory heap.

The search engine may then "cut off" the current generation of documents and initiate the next generation. For example, the search engine may change the status of the current search index segment from read/write to read-only, and generate a new search index segment that may be assigned read/write status. In addition, the search engine may allocate a new heap in which the search index segment is stored. Thus, as the search engine processes documents over time, the search engine may generate and store new search index segments in corresponding memory heaps. For example, at any given time, 20 different search index segments may be maintained in corresponding memory heaps. By "sealing" a generation in a memory heap and updating a new generation in a separate memory heap, concurrency of user queries and the updating of the search index may be facilitated.

In addition, the search engine may store per-query objects in a heap of the memory that is separate from the heaps in which the search index segments are stored. For example, per-query objects may include search terms, a search context, and/or search results. By storing short-lived per-query data separately from long-lived search index data, memory fragmentation may be reduced.

One or more heaps of memory may be released at 404. The heaps of memory that are released may include search index segments and/or per-query objects. More particularly, since relevance of data decays over time and search is a best-effort service, search index segments that are oldest may be discarded over time. As search index segments are discarded, the corresponding memory heap(s) may be released. Garbage collection may release multiple heaps of memory in bulk to manage memory more efficiently while reducing fragmentation. In this manner, garbage collection may be performed to support the dynamic real-time nature of the search index.

The disclosed embodiments may be implemented by a search node (e.g., search server or processor). A search system such as that described herein may implement multiple search nodes.

Network

A network may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

Content Distribution Network

A distributed system may include a content distribution network. A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. Services may also make use of ancillary technologies including, but not limited to, "cloud computing," distributed storage, DNS request handling, provisioning, signal monitoring and reporting, content targeting, personalization, or business intelligence. A CDN may also enable an entity to operate or manage another's site infrastructure, in whole or in part.

Peer-to-Peer Network

A peer-to-peer (or P2P) network may employ computing power or bandwidth of network participants in contrast with a network that may employ dedicated devices, such as dedicated servers, for example; however, some networks may employ both as well as other approaches. A P2P network may typically be used for coupling devices via an ad hoc arrangement or configuration. A peer-to-peer network may employ some devices capable of operating as both a "client" and a "server."

Wireless Network

A wireless network may couple client devices with a network. A wireless network may employ stand-alone ad-hoc networks, mesh networks, Wireless LAN (WLAN) networks, cellular networks, or the like.

A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Internet Protocol

Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6.

The Internet refers to a decentralized global network of networks. The Internet includes LANs, WANs, wireless networks, or long haul public networks that, for example, allow signal packets to be communicated between LANs. Signal packets may be communicated between devices of a network, such as, for example, to one or more sites employing a local network address. A signal packet may, for example, be communicated over the Internet from a user site via an access device coupled to the Internet. Likewise, a signal packet may be forwarded via network devices to a target site coupled to the network via a network access device, for example. A signal packet communicated via the Internet may, for example, be routed via a path of gateways, servers, etc. that may route the signal packet in accordance with a target address and availability of a network path to the target address.

Server

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

Content Server

A content server may comprise a device that includes a configuration to provide content via a network to another device. A content server may, for example, host a site, such as a social networking site, examples of which may include, without limitation, Flicker, Twitter, Facebook, LinkedIn, or a personal user site (such as a blog, vlog, online dating site, etc.). A content server may also host a variety of other sites, including, but not limited to business sites, educational sites, dictionary sites, encyclopedia sites, wikis, financial sites, government sites, etc.

A content server may further provide a variety of services that include, but are not limited to, web services, third-party services, audio services, video services, email services, instant messaging (IM) services, SMS services, MMS services, FTP services, voice over IP (VOIP) services, calendaring services, photo services, or the like. Examples of content may include text, images, audio, video, or the like, which may be processed in the form of physical signals, such as electrical signals, for example, or may be stored in memory, as physical states, for example.

Examples of devices that may operate as a content server include desktop computers, multiprocessor systems, microprocessor-type or programmable consumer electronics, etc.

Regardless of the system's configuration, it may employ one or more memories or memory modules configured to store data, program instructions for the general-purpose processing operations and/or the inventive techniques described herein. The program instructions may control the operation of an operating system and/or one or more applications, for example. The memory or memories may also be configured to store instructions for performing the disclosed methods.

Because such information and program instructions may be employed to implement the systems/methods described herein, the disclosed embodiments relate to machine readable media that include program instructions, state information, etc. for performing various operations described herein. Examples of machine-readable media include, but are not limited to, magnetic media such as hard disks and magnetic tape; optical media such as CD-ROM disks; magneto-optical media such as optical disks; and hardware devices that are specially configured to store and perform program instructions, such as ROM and RAM. Examples of program instructions include both machine code, such as produced by a compiler, and files containing higher level code that may be executed by the computer using an interpreter.

Computer program instructions with which various embodiments are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

The disclosed techniques may be implemented in any suitable combination of software and/or hardware system, such as a web-based server. The processes presented herein are not inherently related to any particular computer or other apparatus. In particular, various general-purpose machines may be used with programs written in accordance with the teachings herein.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A method, comprising:
generating and storing in memory, by a search engine, a first search index segment of a search index, the first search index segment being stored in a first heap of the memory, the first search index segment including one or more first inverted index segments mapping content to a first set of documents, the search index being an inverted index;

generating and storing in the memory, by the search engine, a second search index segment of the search index, the second search index segment being stored in a second heap of the memory concurrent with the first heap of the memory, the second search index segment including one or more second inverted index segments mapping content to a second set of documents, the second set of documents being more recently processed by the search engine than the first set of documents;

updating the second search index segment until a threshold corresponding to a number of documents or an amount of memory has been reached;

responsive to determining that the threshold corresponding to the number of documents or the amount of memory has been reached:

cutting off a current generation of documents associated with the second heap of the memory by changing a status of the second search index segment being stored in the second heap of the memory from a read/write status to a read-only status; and initiating a next generation of documents by generating a third search index segment of the search index, wherein the third search index segment is assigned the read/write status and is stored in a new heap of the memory associated with the next generation of documents; and releasing, by a garbage collection module, a third heap of the memory, the third heap of the memory storing a fourth search index segment of the search index, the fourth search index segment generated by the search engine and including one or more third inverted index segments, the third heap of the memory being released based on at least one of a determination that a threshold of amount of memory has been consumed or a determination that a threshold number of search index segments are stored.

2. The method of claim 1, comprising:
storing in the memory, by the search engine, per-query objects in a fourth heap of the memory that is separate from the first heap, the second heap, and the third heap.

3. The method of claim 1, wherein the first set of documents corresponds to a first generation of documents and the second set of documents corresponds to a second generation of documents.

4. The method of claim 1, wherein the third heap comprises the new heap and the fourth search index segment comprises the third search index segment.

5. The method of claim 1, wherein the second search index segment is generated and stored in real-time as documents are obtained, received, or processed.

6. The method of claim 1, wherein the first heap of the memory is associated with a first core of a central processing unit (CPU), and wherein the second heap of the memory is associated with a second core of the CPU.

7. The method of claim 1, comprising: storing, by a central processing unit (CPU) core, an object in one pool of two or more pools associated with the CPU core according to a size of the object.

8. The method of claim 7, wherein each pool of the two or more pools is associated with at least one range of two or more ranges of object sizes.

9. A system, comprising:
one or more processors; and
at least some memory, at least one of the one or more processors or the at least some memory being configured to:

generate and store in memory, by a search engine, a first search index segment of a search index, the first search index segment being stored in a first heap of the memory, the first search index segment including one or more first inverted index segments mapping content to a first set of documents, the search index being an inverted index;

generate and store in the memory, by the search engine, a second search index segment of the search index, the second search index segment being stored in a second heap of the memory concurrent with the first heap of the memory, the second search index segment including one or more second inverted index segments mapping content to a second set of documents, the second set of documents being more recently processed by the search engine than the first set of documents;

update the second search index segment until a threshold corresponding to a number of documents or an amount of memory has been reached;

responsive to determining that the threshold corresponding to the number of documents or the amount of memory has been reached:

cut off a current generation of documents associated with the second heap of the memory by changing a status of the second search index segment being stored in the second heap of the memory from a read/write status to a read-only status; and initiate a next generation of documents by generating a third search index segment of the search index, wherein the third search index segment is assigned the read/write status and is stored in a new heap of the memory associated with the next generation of documents; and release, by a garbage collection module, a third heap of the memory, the third heap of the memory storing a fourth search index segment of the search index, the fourth search index segment generated by the search engine and including one or more third inverted index segments, the third heap of the memory being released based on a determination that a threshold of amount of memory has been consumed.

10. The system of claim 9, at least one of the one or more processors or the memory being configured to:
store, by the search engine, per-query objects in a fourth heap of the memory that is separate from the first heap, the second heap, and the third heap.

11. The system of claim 9, wherein the first set of documents corresponds to a first generation of documents and the second set of documents corresponds to a second generation of documents.

12. The system of claim 9, wherein the second search index segment is generated and stored in real-time as documents are obtained, received, or processed.

13. The system of claim 9, wherein the first heap comprises two or more sub-heaps.

14. The system of claim 9, wherein the first heap comprises two or more sub-heaps, wherein each one of the two or more sub-heaps is associated with at least one of two or more ranges of object sizes.

15. The method of claim 13, each of the two or more sub-heaps being associated with at least one central processing unit (CPU) core.

16. A non-transitory computer-readable storage medium storing thereon computer-readable storage medium, comprising:
instructions configured to generate and store in memory, by a search engine, a first search index segment of a search index, the first search index segment being stored in a first heap of the memory, the first search index segment including one or more first inverted index segments mapping content to a first set of documents, the search index being an inverted index;
instructions configured to generate and store in the memory, by the search engine, a second search index segment of the search index, the second search index segment being stored in a second heap of the memory concurrent with the first heap of the memory, the second search index segment including one or more second inverted index segments mapping content to a second set of documents, the second set of documents being more recently processed by the search engine than the first set of documents;
instructions configured to update the second search index segment until a threshold corresponding to a number of documents or an amount of memory has been reached;
instructions configured to responsive to determining that the threshold corresponding to the number of documents or the amount of memory has been reached:
cut off a current generation of documents associated with the second heap of the memory by changing a status of the second search index segment being stored in the second heap of the memory from a read/write status to a read-only status; and
initiate a next generation of documents by generating a third search index segment of the search index, wherein the third search index segment is assigned the read/write status and is stored in a new heap of the memory associated with the next generation of documents; and
instructions configured to release a third heap of the memory, the third heap of the memory storing a fourth search index segment of the search index, the fourth search index segment generated by the search engine and including one or more third inverted index segments, the third heap of the memory being released based on a determination that a threshold number of search index segments are stored.

17. The non-transitory computer-readable storage medium of claim 16, comprising:
instructions for storing per-query objects in a fourth heap of the memory that is separate from the first heap, the second heap, and the third heap.

18. The non-transitory computer-readable storage medium of claim 16, wherein releasing the third heap of the memory comprises: releasing a single heap of the memory.

19. The non-transitory computer-readable storage medium of claim 16, wherein the first heap comprises two or more sub-heaps, each of the two or more sub-heaps being associated with at least one central processing unit (CPU) core.

20. The system of claim 9, at least one of the one or more processors or the memory being configured to:
store, by a central processing unit (CPU) core, an object in one of two or more pools according to a size of the object;
wherein each one of the two or more pools is associated with at least one of two or more ranges of object sizes.

21. The method of claim 1, wherein releasing, by the garbage collection module, the third heap of the memory comprises:
releasing a single heap of the memory.

22. The method of claim 1, comprising: selecting the first heap of the memory.

23. The method of claim 1, comprising:
processing a search query using the search index; and
updating the second search index segment concurrent with processing the search query.

24. The method of claim 22, comprising: selecting the second heap of the memory.

25. The method of claim 24, comprising: releasing the first heap of the memory and the second heap of the memory.

* * * * *